United States Patent
Hoang et al.

(10) Patent No.: US 10,841,216 B1
(45) Date of Patent: Nov. 17, 2020

(54) LOCAL-BIAS FORWARDING OF L2 MULTICAST, UNKNOWN UNICAST, AND BROADCAST TRAFFIC FOR AN ETHERNET VPN

(71) Applicant: Juniper Networks, Inc., Sunnyvale, CA (US)

(72) Inventors: Levinh Hoang, Sunnyvale, CA (US); Vijayananda Jayaraman, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 15 days.

(21) Appl. No.: 15/473,462

(22) Filed: Mar. 29, 2017

(51) Int. Cl.
*H04L 12/721* (2013.01)
*H04L 12/46* (2006.01)

(52) U.S. Cl.
CPC .......... *H04L 45/66* (2013.01); *H04L 12/4641* (2013.01)

(58) Field of Classification Search
None
See application file for complete search history.

(56) References Cited

U.S. PATENT DOCUMENTS

2017/0317919 A1* 11/2017 Fernando ............ H04L 61/103
2018/0109436 A1* 4/2018 Sajassi ................ H04L 45/28

OTHER PUBLICATIONS

Saiassi, et al., "A Network Virtualization Overlay Solution using EVPN," https://iools.ietf.org/htnil/dtaft-ietf-bess-evpn-overlay-01, Feb. 2015, pp. 1-24.*
Sajassi, et al., "BGP MPLS-Based Ethernet VPN," Internet Engineering Task Force, RFC 7432, Feb. 2015, 56 pp.
Rekhter, et al., "A Border Gateway Protocol 4 (BGP-4)," Network Working Group, RFC 4271, Jan. 2006, 104 pp.
Cisco, et al., "BGP Extended Communities Attribute," Network Working Group, RFC 4360, Feb. 2006, 12 pp.
"Juniper Networks EVPN Implementation for Next-Generation Data Center Architectures," Juniper Networks, Jul. 2015, 62 pp.
"Understanding Junos Fusion Provider Edge Components," Juniper Networks, Feb. 6, 2017, 5 pp.
Bates, et al., "Multiprotocol Extensions for BGP-4," Network Working Group, RFC 4760, Jan. 2007, 12 pp.

* cited by examiner

*Primary Examiner* — Christopher M Crutchfield
*Assistant Examiner* — Alan L Lindenbaum
(74) *Attorney, Agent, or Firm* — Shumaker & Sieffert, P.A.

(57) ABSTRACT

In general, techniques are described for forwarding L2 BUM traffic within an Ethernet Virtual Private Network (EVPN) by implementing a forwarding preference for local interfaces of a PE device for broadcast domains in the EVPN. For example, a method includes receiving, by a first provider edge (PE) device of a plurality of PE devices configured with an EVPN instance comprising one or more broadcast domains reachable by a plurality of Ethernet segments connecting the plurality of PE devices to a plurality of customer edge (CE) devices, first EVPN routes; and configuring, by the first PE device in response to determining the first EVPN routes indicate the first PE device has a local interface for each of the plurality of Ethernet segments, forwarding information of the first PE device to cause the first PE device to perform local-bias forwarding of layer 2 (L2) packets for the EVPN instance.

17 Claims, 9 Drawing Sheets

TOPOLOGY TABLE
300A

| INTERFACE | A-D PER ES (TYPE 1) | ES (TYPE 4) |
|---|---|---|
| ESI_14A | TRUE | TRUE |
| ESI_14B | TRUE | TRUE |
| ESI_14C | TRUE | TRUE |

FIG. 4A

TOPOLOGY TABLE
300B

| INTERFACE | A-D PER ES (TYPE 1) | ES (TYPE 4) |
|---|---|---|
| ESI_14A | TRUE | TRUE |
| ESI_14B | TRUE | TRUE |
| ESI_14C | TRUE | FALSE |

FIG. 4B

TOPOLOGY TABLE
600

| INTERFACE | A-D PER ES (TYPE 1) | ES (TYPE 4) |
|---|---|---|
| ESI_14A | TRUE | TRUE |
| ESI_14B | TRUE | TRUE |
| ESI_14C | TRUE | FALSE |

FIG. 6

LOCAL-BIAS FORWARDING OF L2 MULTICAST, UNKNOWN UNICAST, AND BROADCAST TRAFFIC FOR AN ETHERNET VPN

TECHNICAL FIELD

The disclosure relates to computer networks and, more particularly, to routing packets within computer networks.

BACKGROUND

A computer network is a collection of interconnected computing devices that can exchange data and share resources. Example network devices include switches or other layer two devices that operate within the second layer (L2) of the Open Systems Interconnection (OSI) reference model, i.e., the data link layer, and routers or other layer three (L3) devices that operate within the third layer of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) devices coupled to the customer edge (CE) devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the PE devices.

In an EVPN, L2 address learning (also referred to as "MAC learning") in a PE device occurs in the control plane rather than in the data plane (as happens with traditional bridging) using a routing protocol. For example, in EVPNs, a PE device typically uses the Border Gateway Protocol (BGP) (i.e., an L3 routing protocol) to advertise to other provider edge network devices the MAC addresses the PE device has learned from the local consumer edge network devices to which the PE device is connected. As one example, a PE device may use a BGP route advertisement message to announce reachability information for the EVPN, where the BGP route advertisement specifies one or more MAC addresses learned by the PE device instead of L3 routing information. Additional example information with respect to EVPN is described in "BGP MPLS-Based Ethernet VPN," Request for Comments (RFC) 7432, Internet Engineering Task Force (IETF), February, 2015, the entire contents of which are incorporated herein by reference.

When forwarding L2 broadcast, unknown unicast, and multicast (BUM) traffic, to reach broadcast domains (e.g., VLANs) for an EVPN instance that are reachable only via one or more remote PE devices, a PE device may use ingress replication or point-to-multipoint (P2MP) replication to send the L2 BUM traffic to the remote PE devices for forwarding on the Ethernet segments for the broadcast domains.

SUMMARY

In general, techniques are described for forwarding layer 2 (L2) multicast, unknown unicast, and broadcast (BUM) traffic within an Ethernet Virtual Private Network (EVPN) by implementing a forwarding preference for local interfaces of a PE device for broadcast domains in the EVPN. A plurality of PE devices of an L3 network may be configured to provide an EVPN instance to multiple customer networks attached via Ethernet segments to the PE devices. One or more of the customer networks may be multihomed to multiple PE devices such that, for each such multihomed customer network, multiple PE devices may each have a local interface for an Ethernet segment coupling the PE devices to the multihomed customer network.

In some examples, a source PE device of the multiple PE devices configured with the EVPN instance may receive, via an Ethernet segment, an L2 BUM packet for forwarding to the broadcast domain of the EVPN instance for the L2 BUM packet. Based on Ethernet Auto-Discovery (AD) (Type 1) and Ethernet Segment (Type 4) EVPN routes, originated or received by the source PE device, that advertise Ethernet segments reachable via the multiple PE devices, the source PE device may send, using ingress replication, the L2 BUM packet only to PE devices that advertise Ethernet segments for which the source PE device does not have a local interface. The source PE device may block or otherwise eschew ingress replication to PE devices that do not advertise Ethernet segments for the broadcast domain for which the source PE device does not have a local interface. The source PE device also forwards the L2 BUM packet to the customer networks via each of its locally-reachable Ethernet segments. In this way, the source PE device may implement local-bias forwarding for L2 BUM replication for an EVPN instance.

In some examples, a source PE device of the multiple PE devices configured with the EVPN instance may receive, via an Ethernet segment, an L2 BUM packet for forwarding to the broadcast domain of the EVPN instance for the L2 BUM packet. Based on Ethernet Auto-Discovery (AD) (Type 1) and Ethernet Segment (Type 4) EVPN routes, originated or received by the source PE device, that advertise Ethernet segments reachable via the multiple PE devices, the source PE device may block or otherwise eschew P2MP replication to the other PE devices if there are no Ethernet segments for the broadcast domain for which the source PE does not have a local interface. Instead, the source PE forwards the L2 BUM packet to the customer networks via each of its locally-reachable Ethernet segments. If there is an Ethernet segment for the broadcast domain for which the source PE does not have a local interface, then the source PE uses P2MP replication to the receivers on the P2MP tunnel.

In some examples, the PE devices advertise local-bias labels for their locally-reachable Ethernet segments. For instance, a PE device may include, with an Ethernet AD route, a local-bias community attribute that includes a local-bias label for the Ethernet segment advertised in the Ethernet AD route. When a PE device implementing local-bias forwarding sends, using ingress replication, an L2 BUM packet to a remote PE device that advertises an Ethernet segment for which the source PE device does not have a local interface, the PE device pushes the local-bias label instead of the Ethernet segment identifier (ESI) label, where the ESI is used for split-horizon filtering per RFC 7432. A destination PE device that is a designated forwarder for an Ethernet segment that receives the L2 BUM packet with the local-bias label in the label stack may determine, by identifying the source PE device from the local-bias label and determining local reachability of one or more Ethernet segments from the source PE device based on Ethernet AD routes advertised by the source PE device, whether to forward the L2 BUM packet via Ethernet segments locally-reachable from the destination PE device.

Implementing local-bias forwarding in this way may provide one or more advantages. For example, PE devices that implement local-bias forwarding for an EVPN may reduce core bandwidth utilization between PE devices for L2 BUM traffic by favoring local Ethernet segments with source PE devices that receive L2 BUM traffic from the customer networks. As another example, because both latency and latency variability for EVPN packet delivery correlates strongly to latency across the EVPN core, local-basis forwarding that favors local Ethernet segments may reduce at least one of latency and latency variability among customer endpoint receiving devices of L2 BUM traffic.

In some examples, a method includes receiving, by a first provider edge (PE) device of a plurality of PE devices configured with an Ethernet Virtual Private Network (EVPN) instance comprising one or more broadcast domains reachable by a plurality of Ethernet segments connecting the plurality of PE devices to a plurality of customer edge (CE) devices, first EVPN routes; and configuring, by the first PE device in response to determining the first EVPN routes indicate the first PE device has a local interface for each of the plurality of Ethernet segments, forwarding information of the first PE device to cause the first PE device to perform local-bias forwarding of layer 2 (L2) packets for the EVPN instance.

In some examples, a method includes receiving, by a first provider edge (PE) device of a plurality of PE devices configured with an Ethernet Virtual Private Network (EVPN) instance comprising one or more broadcast domains reachable by a plurality of Ethernet segments connecting the plurality of PE devices to a plurality of customer edge (CE) devices, an L2 packet for the first EVPN instance with a local-bias label, via an intermediate layer 3 network interconnecting the plurality of PE devices; and outputting, by the first PE device in response to determining a second PE device, of the plurality of PE devices, that is indicated by the local-bias label does not have a local interface for a first Ethernet segment of the plurality of Ethernet segments, the L2 packet on a local interface of the first PE device for the first Ethernet segment.

In some examples, a first provider edge (PE) device includes a memory; and one or more processors operably coupled to the memory, wherein the one or more processors and memory are configured to: receive configuration data configuring the first PE device with an Ethernet Virtual Private Network (EVPN) instance comprising one or more broadcast domains reachable by a plurality of Ethernet segments connecting a plurality of PE devices, including the first PE device, to a plurality of customer edge (CE) devices, receive first EVPN routes, and configure, in response to a determination the first EVPN routes indicate the first PE device has a local interface for each of the plurality of Ethernet segments, forwarding information of the first PE device to cause the first PE device to perform local-bias forwarding of layer 2 (L2) packets for the EVPN instance.

In some examples, a first provider edge (PE) device includes a memory; and one or more processors operably coupled to the memory, wherein the one or more processors and memory are configured to: receive configuration data configuring the first PE device with an Ethernet Virtual Private Network (EVPN) instance comprising one or more broadcast domains reachable by a plurality of Ethernet segments connecting a plurality of PE devices, including the first PE device, to a plurality of customer edge (CE) devices, receive an L2 packet for the first EVPN instance with a local-bias label, via an intermediate layer 3 network interconnecting the plurality of PE devices, and output, in response to determining a second PE device, of the plurality of PE devices, that is indicated by the local-bias label does not have a local interface for a first Ethernet segment of the plurality of Ethernet segments, the L2 packet on a local interface of the first PE device for the first Ethernet segment.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4B depict example topology tables for implementing local-bias forwarding, according to techniques described in this disclosure.

FIG. 6 depicts an example topology table for implementing local-bias forwarding, according to techniques described in this disclosure.

Like reference characters denote like elements throughout the figures and text.

DETAILED DESCRIPTION

Figure 1:
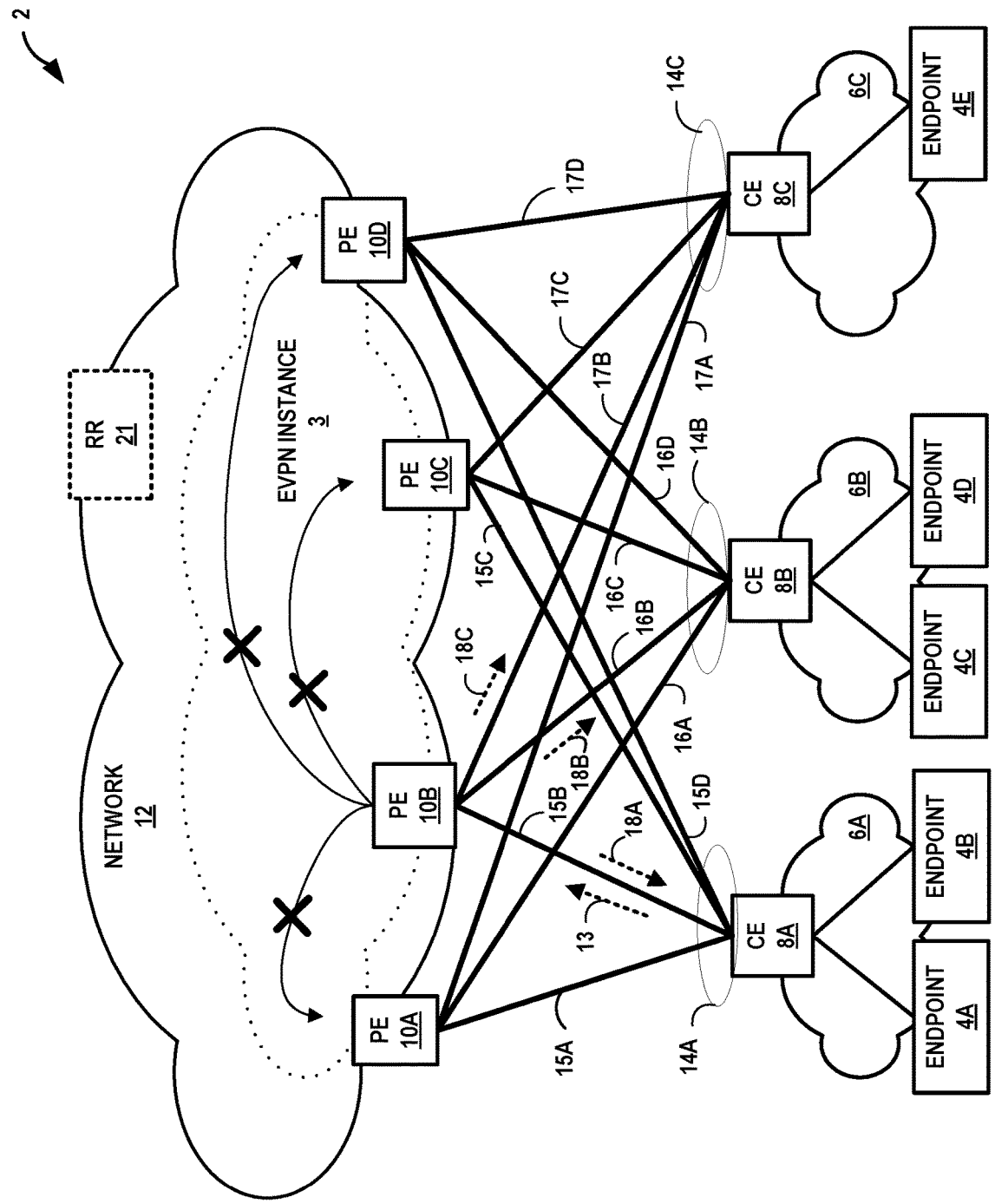
FIG. 1 is a block diagram illustrating an example system, in accordance with techniques of the disclosure.

FIG. 1 is a block diagram illustrating an example system 2, in accordance with techniques of the disclosure. In the example of FIG. 1, PE devices 10A-10D ("PE devices 10" or, more simply, "PEs 10") provide customer endpoints 4A-4E ("endpoints 4") associated with customer networks 6A-6C ("customer networks 6") with access to an intermediate layer 3 (L3) network 12 (alternatively referred to herein as the "core network 12" or the "EVPN core 12") via customer edge (CE) routers 8A-8C ("CEs 8").

Each of PEs 10 and CEs 8 may each represent a router, switch, or other suitable network devices that participates in a layer two (L2) virtual private network (VPN) (L2VPN) service, such as an EVPN. Customer networks 6 may represent customer networks associated with one or more tenants of a data center that includes intermediate network 12.

Each of endpoints 4 may represent one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Each of endpoints 4 may be a host, server, virtual machine, container, or other source or destination for L2 traffic. The configuration of system 2 illustrated in FIG. 1 is merely an example. For example, system 2 may include any number of customer networks 6. Nonetheless, for ease of description, only customer networks 6A-6C are illustrated in FIG. 1. In some cases, any one or more of CEs 8 may be a customer endpoint or "host."

Intermediate network 12 may represent a service provider network that is owned and operated by a service provider, which is usually large telecommunications entity or corporation. Intermediate network 12 represents an L3 computer network, where reference to a layer followed by a number refers to a corresponding layer in the Open Systems Interconnection (OSI) model. Intermediate network 12 is a L3 network in the sense that it natively supports L3 operations as described in the OSI model. Common L3 operations include those performed in accordance with L3 protocols, such as the Internet protocol (IP). L3 is also known as a "network layer" in the Open Standards Interconnection model and the "IP layer" in the TCP/IP model, and the term L3 may be used interchangeably with the and "network layer" and "IP" throughout this disclosure. Intermediate network 12 may also implement MPLS, Generic Route Encapsulation (GRE), or another tunneling protocol. Intermediate network 12 may alternatively be referred to as an "MPLS/IP core network."

In the example of FIG. 1, intermediate network 12 and Ethernet segments 14 represent a data center L2/L3 switching fabric (or "data center fabric network") that interconnects CEs for tenants of the data center, where a tenant may represent an organization or a logical partitioning of resources, data, and/or applications within the data center. Although not illustrated, EVPN network 12 may be coupled to one or more networks administered by other providers, and may thus form part of a large-scale public network infrastructure, e.g., the Internet. EVPN network 12 may provide computing devices within customer networks 6 with access to the Internet, and may allow the computing devices within the customer networks to communicate with each other.

Intermediate network 12 may include a variety of network devices other than PEs 10. For instance, intermediate network 12 may include a route reflector (RR) 21 depicted in dashed lines to denote that RR 21 is optional) having routing protocol sessions with each of PEs 10, one or more provider routers (also known as "P" or "core" routers), switches, and so forth. In some examples, the route reflector 21 may reside within intermediate network 12 and along a path in intermediate network 12 between two or more PEs. In some cases, any one or more of PEs 10 or separate core routers (not shown) of intermediate network 12 and coupled to PEs 10 may have one or more wide area network (WAN) interfaces to PE devices external to a data center that includes intermediate network 12.

Although not shown for ease of illustration/explanation purposes, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Intermediate network 12 may provide a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by a service provider intermediate network 12 includes L2 EVPN service. Intermediate network 12 may represent an L2/L3 switch fabric for one or more data centers that may provide a form of L2 connectivity across an intermediate L3 network, such as intermediate network 12, to interconnect two or more L2 customer networks, such as L2 customer networks 6, that may be located in different racks in the case of a data center implementation. Often, EVPN is transparent to the customer networks in that these customer networks are not aware of the intervening intermediate network and instead act and operate as if these customer networks were directly connected and formed a single L2 network. In a way, EVPN enables a form of a transparent local area network (LAN) connection between two customer sites that each operates a L2 network and, for this reason, EVPN may also be referred to as a "transparent LAN service."

To configure an EVPN, a network operator of the intermediate network 12 configures, via configuration or management interfaces, various devices included within intermediate network 12 that interface with L2 customer networks 6. The EVPN configuration may include an EVPN instance (EVI), which includes one or more broadcast domains, such as virtual local area networks (VLANs) of customer networks 6. Generally, an EVI may be associated with a virtual routing and forwarding instance (VRF) on a PE device, such as any of PE devices 10A-10D, for storing EVPN routes exchanged via Border Gateway Protocol (BGP) for the EVI. Multiple EVIs may be configured on PE devices 10 for Ethernet segments 14A-14D (collectively, "Ethernet segments 14" or "ESes 14"), as further described herein, each providing a separate, logical layer two (L2) forwarding domain. Ethernet Tags may be used to identify a particular broadcast domain, e.g., a virtual LAN (VLAN), for an EVI.

Ethernet segments 14 may each be assigned a unique identifier, referred to as an Ethernet Segment Identifier (ESI). As described in further detail below, because each of Ethernet segments 14 is multihomed to multiple PEs 10, the respective ESIs for Ethernet segments 14 are non-zero and unique within system 2.

In some examples, system 2 may include VXLAN overlay networks operating over one or more underlay layer 3 networks connecting PEs 10 to CEs 6. In such examples, each of Ethernet segments 14 may represent a VXLAN overlay network with a different VXLAN network identifier (VNI).

In the illustrated example, an EVPN instance (EVI) 3 is configured within EVPN network 12 for customer networks 6 to enable endpoints 4 within customer networks 6 to communicate with one another via the EVI as if endpoints 4 were directly connected via an L2 network. As used herein, an EVI may represent an EVPN routing and forwarding instance spanning PE devices 10A-10D configured with the EVI 3. Each of PEs 10 is configured with EVI 3 and exchanges EVPN routes to implement EVI 3.

As shown in FIG. 1, each of CEs 8 (and each of Ethernet segments 14) is multihomed to multiple PEs 10. In EVPN, a CE is multihomed when it can access intermediate network 12 via two or more separate PE devices on the same EVI when the multi-homing PE devices have interfaces with the same Ethernet segment. In instances where a given customer network (such as customer network 6A) may couple to EVPN network 12 via two different and, to a certain extent, redundant links, the customer network may be referred to as being "multihomed." For example, CE 8A is multihomed to PE devices 10A-10D because CE 8A is coupled to different PE devices 10A-10D via separate and, to a certain extent, redundant Ethernet links 15A-15D, respectively, of Ethernet segment 14A where PE devices 10A-10D are each capable of providing the EVPN service for L2 customer network 6A via CE 8A. Likewise, CE 8B is multihomed to PE devices 10A-10D via multihomed Ethernet segment 14B having Ethernet links 16A-16D, CE 8C is multihomed to PE devices 10A-10D via multihomed Ethernet segment 14C having Ethernet links 17A-17D. One or more Ethernet tags may be configured on each of Ethernet segments 14. Multihomed networks are often employed by network operators so as to improve access to EVPN provided by intermediate network 12 should a failure in one of Ethernet links 15, 16, 17 occur.

PEs 10 are configured operate in active-active redundancy mode with respect to Ethernet segments 14, whereby all PEs 10 connected to a given Ethernet segment 14 are operable to forward traffic to and from the Ethernet segment. Each of Ethernet segments 14 may as a link aggregation group to the CE 8 connected to the Ethernet segment.

PEs 10 participate in designated forwarder (DF) election for each connected Ethernet segment. PEs 10 may implement DF election using RFC 7432, Section 8.5. For example, PEs 10 that participate in any of Ethernet segments 14A-14C output EVPN Ethernet Segment (Type 4) routes advertising ESIs, and PEs 10 may apply RFC 7432, Section 8.5 to determine the DFs on a per-broadcast domain, per Ethernet segment basis based on the EVPN Ethernet Segment routes for all of PEs 10.

In general, a designated forwarder PE of the PEs 10 is responsible for sending L2 BUM traffic for a broadcast domain (e.g., VLAN) for an Ethernet segment 14. That is, a designated forwarder PE of PEs 10 for an ES 14 is responsible for sending unknown (or "unidentified") unicast traffic (i.e., traffic for which a PE does not have L2 forwarding information for the destination MAC address of the traffic), on a given Ethernet Tag on a particular Ethernet segment to the CE router homed using that Ethernet segment. The designated forwarder PE of PEs 10 is also responsible for sending multicast and broadcast traffic, on a given Ethernet Tag on a particular Ethernet segment to the CE router homed using that Ethernet segment. In the illustrated example, PE 10D is a designated forwarder for Ethernet segment 14C for at least one broadcast domain.

Using ESIs, PEs 10 may share learned MAC addresses by sending MAC Advertisement routes that specify, among other information, a learned MAC address and a corresponding ESI and Ethernet Tag ID. In this way, PE devices may maintain tables of MAC addresses associated with corresponding ESIs and Ethernet Tag IDs. Consequently, a PE device that receives and stores MAC addresses that were previously learned by other PE devices can determine that a MAC address is accessible through multiple PE devices that provide reachability to the same ESI.

PEs 10 use control plane signaling with different route types to implement the EVPN service in EVPN network 12. EVPN defines BGP Network Layer Reachability Information (NLRI), and in particular, defines different route types. The EVPN NLRI is carried in BGP using BGP Multiprotocol Extensions. Route types include but are not limited to Ethernet Auto-Discovery (AD) per Ethernet segment routes (Type 1), MAC advertisement routes (Type 2), Inclusive Multicast Ethernet Tag (IMET) routes (Type 3), and Ethernet Segment routes (Type 4).

In typical operation, PE devices 10A-10D advertise Ethernet AD routes specifying the relevant ESI for the Ethernet segment for the EVI. That is, each of PEs 10 may advertise an Ethernet AD route per Ethernet segment to advertise reachability of the PE device for the Ethernet segment. An Ethernet AD route advertised by each of PE devices 10A-10D specifies a Route Distinguisher (RD) (which may include, e.g., an IP address of the originating PE), ESI, Ethernet Tag Identifier, and MPLS label, for example. Per RFC 7432, the Ethernet AD route advertisement may also include an ESI Label extended community attribute to enable split-horizon procedures for multihomed sites.

PE devices may also send and receive Ethernet Segment routes to automatically discover other PE devices connected to the same Ethernet segment. An Ethernet Segment route specifies a Route Distinguisher, Ethernet Segment Identifier, and an originating router's IP address, for example.

In the example of FIG. 1, when providing the EVPN service to customer networks 6, PEs 10 and CEs 8 perform MAC address learning to forward L2 network communications in system 2. That is, as PEs 10 and CEs 8 forward Ethernet frames, the routers learn L2 state information for the L2 network, including MAC addressing information for endpoints 4 within the network and the physical ports through which endpoints 4 are reachable. PEs 10 and CEs 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

As shown in the example of FIG. 1, intermediate network 12 may provide an MPLS core or IP tunneling infrastructure for sending packets among customer networks 6A-6C. Each of PE devices 10A-10D implement the MPLS protocol and apply one or more MPLS labels, i.e., a label stack, to packets in accordance with routing and forwarding information configured at each respective PE device. In an EVPN, a label stack applied to a packet may include multiple labels.

Each of PEs 10 advertises Ethernet A-D per ES routes to advertise or withdraw reachability to ESIs 14 for the PE. Because each of Ethernet segments 14 is multihomed to multiple PEs 10, the respective ESIs for Ethernet segments 14 are non-zero and unique within system 2. An Ethernet A-D per ES route includes the following fields:

TABLE I

| Ethernet A-D route |
| --- |
| Route Distinguisher |
| Ethernet Segment Identifier |
| Ethernet Tag ID |
| MPLS Label |

The Ethernet Segment Identifier field value for an Ethernet A-D per ES route identifies the Ethernet segment being advertised by the PE 10 that originated the route. Per RFC 7432 Section 8.2-8.3, the Ethernet A-D per ES route may also include an ESI Label extended community to enable split horizon forwarding. PEs 10 store Ethernet A-D per ES and other EVPN routes to the routing table for EVI 3. Each of Ethernet segments 14 is advertised with an Ethernet Tag ID for EVI 3.

To enable PEs 10 connected to the same Ethernet segment 14 to automatically discover one another and for purposes of Designated Forwarder election per ES, each PE of PEs 10 advertises an Ethernet Segment route for each of the Ethernet Segments multihomed by the PE. For example, PE 10A advertises an Ethernet Segment route for each of Ethernet segments 14A, 14B, and 14C.

An Ethernet Segment route includes the following fields:

TABLE 2

| Ethernet Segment route |
| --- |
| Route Distinguisher (8 octets) |
| Ethernet Segment Identifier (10 octets) |
| IP Address Length (1 octet) |
| Originating Router's IP Address (4 or 16 octets) |

The Ethernet Segment Identifier field value for an Ethernet Segment route identifies the Ethernet segment being advertised by the PE 10 that originated the route. The Originating Router's IP Address field values identifies an IP address for the PE that originated the route. PEs 10 may apply RFC 7432 Section 8.5 to perform Designated Forwarder election using Ethernet Segment routes for each of PEs 10.

Per RFC 7432 Sections 11-12, a PE device may receive ingress L2 BUM traffic encapsulated in the Ethernet tag (e.g., VLAN tag) in an EVPN instance from a CE and implement ingress replication techniques to replicate, via the core network, the L2 BUM traffic to all other PEs that span the Ethernet tag in that EVPN instance.

However, ingress replication presents core bandwidth utilization issues. For example, traffic that is replicated and sent to other PE devices through the core may cause excessive and inefficient utilization of core bandwidth. Ingress replication may also result in uneven latency among receivers for receiving the L2 BUM traffic. For example, one CE router may receive traffic from a PE device directly, whereas another CE router may subsequently receive replicated traffic from another PE device after the traffic has traversed the intermediate network 12 with the attendant core latency.

In accordance with techniques of this disclosure, a PE 10 that receives ingress L2 BUM traffic may implement local-bias forwarding to prefer local interfaces of the PE 10 for reaching Ethernet segments rather than interfaces that require that the L2 BUM traffic traverse the core network. A local interface for an Ethernet segment connecting a PE with a CE is an interface of the PE for forwarding packets to the CE without traversing intermediate network 12 or a WAN. For example, a local interface may be an interface of a PE chassis corresponding to a port connected to an Ethernet segment having at least one link with the CE. The techniques may be particularly useful for EVPN networks in which all Ethernet segments are multi-homed, i.e., there are no single-homed receivers for L2 BUM traffic.

In the example of FIG. 1, PE 10B receives a L2 BUM packet 13 from CE 8A via Ethernet segment 14A. L2 BUM packet 13 may be an L2 broadcast, unknown unicast, or multicast packet. L2 BUM packet 13 may be encapsulated with an Ethernet tag for EVI 3.

PE 10B, as the source PE for the ingress L2 BUM packet 13, may determine, based on Ethernet A-D routes and Ethernet Segment routes for EVI 3, that PE 10B has local interfaces for each of Ethernet segments 14 and replicate L2 BUM packet 13 on Ethernet segments 14A-14C as L2 BUM packets 18A-18C, respectively. At least in some cases, PE 10B is not a designated forwarder for at least one of Ethernet segments 14. As illustrated in FIG. 1, PE 10B in this way may avoid sending L2 BUM packet 13 via intermediate network 12 to each of PE 10A, PE 10C, and PE 10D.

If PE 10B is configured to perform ingress replication for L2 BUM packets for EVI 3, PE 10B may identify all Ethernet segments 14 having broadcast domains for EVI 3 using Ethernet segment routes that includes an Ethernet tag associated with EVI 3. In addition, for each such identified Ethernet segment 14, using Ethernet A-D per ES routes, PE 10B determines whether PE 10B has a local interface for the identified Ethernet segment 14. If not, PE 10B replicates L2 BUM packet 13 to the PE 10 that advertised the identified Ethernet segment.

If PE 10B is configured to perform P2MP or MP2MP replication for L2 BUM packets for EVI 3, PE 10B may identify all Ethernet segments 14 having broadcast domains for EVI 3 using Ethernet segment routes that includes an Ethernet tag associated with EVI 3. In addition, for each such identified Ethernet segment 14, PE 10B determines whether PE 10B has a local interface for the identified Ethernet segment 14. If there are any identified Ethernet segments 14 for which PE 10B does not have a local interface, PE 10B may output L2 BUM packet using a P2MP tunnel (e.g., a P2MP LSP) or a MP2MP tunnel (e.g., a MP2MP LSP). In such cases, if PE 10B is unable to perform local-bias forwarding for all Ethernet segments 14 having receivers for an L2 BUM packet, PE 10B may be unable to perform replication filtering for remote PEs because PE 10B does not control the underlay P2MP or MP2MP replication trees.

CE devices 6 forward the respective L2 BUM packets 18 to the endpoints 4. By implementing a local-bias forwarding preference for L2 BUM traffic for EVI 3 in this, PE 10B may reduce core bandwidth utilization by reducing forwarding for L2 BUM traffic across intermediate network 12. Moreover, forwarding L2 BUM traffic on local interfaces of the source PE for Ethernet segments may reduce latency and latency variability among receivers of L2 BUM traffic.

Figure 2:
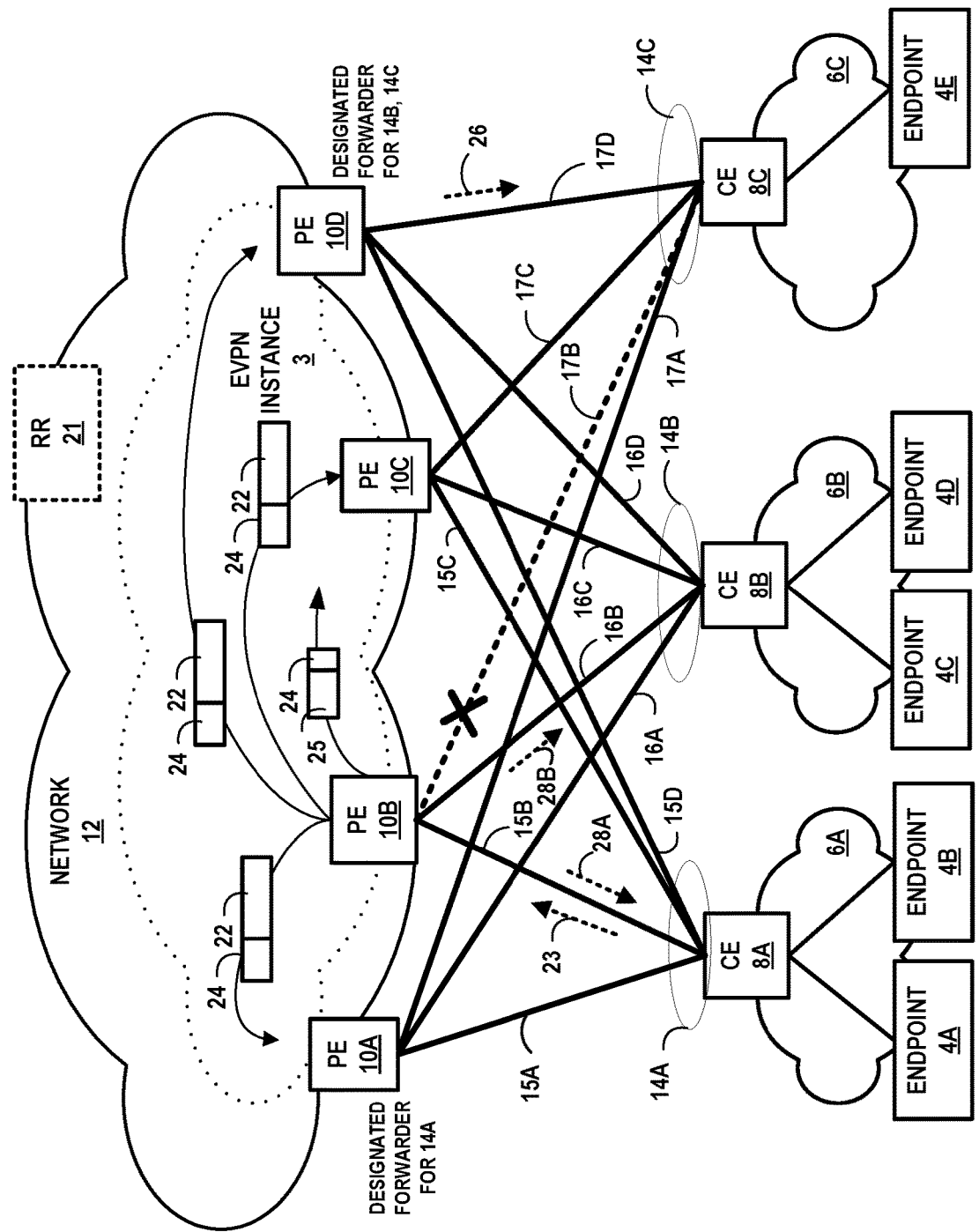
FIG. 2 is a block diagram illustrating the system of FIG. 1 with a modified topology, according to techniques described in this disclosure.

FIG. 2 is a block diagram illustrating the system of FIG. 1 with a modified topology, according to techniques described in this disclosure. In the example of FIG. 2, Ethernet link 17B is failed and PE 10B is unable to forward L2 packets on Ethernet segment 14C as a result.

In response to detecting that the local interface for ES 14C is down due to failure of Ethernet link 17B, PE 10B may withdraw its Ethernet Segment routes for ES 14C. In addition, because PE 10B is no longer multihomed to ES 14C, per RFC 4732 Section 8.1.1 may modify an import filtering rule to no longer import Ethernet Segment routes from any of PEs 10A, 10C, 10D for ES 14C for EVI 3. In addition, PE 10B may delete existing Ethernet Segment routes from any of PEs 10A, 10C, 10D for ES 14C for EVI 3. However, PE 10B continues to import/store Ethernet A-D per ES routes from PEs 10A, 10C, 10D for ES 14C for EVI 3.

PE 10B subsequently receives L2 BUM packet 23 for EVI 3 and performs local-bias forwarding of L2 BUM packet 23 according to techniques of this disclosure. PE 10B may identify all Ethernet segments 14 having broadcast domains for EVI 3 using Ethernet A-D per ES routes for ES 14C for EVI 3. In addition, for each such identified Ethernet segment 14, PE 10B may determine whether PE 10B is to send the L2 BUM packet to any of PEs 10A, 10C, 10D via intermediate network 12. Because PE 10B no longer stores Ethernet Segments routes from any of PEs 10A, 10C, 10D for ES 14C for EVI 3 and because each of these PEs 10A, 10C, 10D has a local interface for ES 14C, as indicated by the Ethernet A-D per ES routes, PE 10B replicates L2 BUM packet 23 to each of PE 10A, 10C, and 10D via intermediate network 12 as L2 BUM packets 22. In addition, PE 10B may not have data that indicates the designated forwarder for 14C for the broadcast domain for L2 BUM packet 23.

In the illustrated example, PE 10B replicates L2 BUM packet 23 to each of PEs 10A, 10C, and 10D as respective L2 BUM packets 22, each of which may be encapsulated with a label and/or tunnel stack for transporting the L2 BUM packet 22 and associating the L2 BUM packet 22 in the receiving PE with EVI 3, per RFC 7432. PE 10D, as the designated forwarder for ES 14C and as described in further detail below, forwards the L2 BUM packet 22 received via intermediate network 12 on the Ethernet segment 14C to CE 8C as L2 BUM packet 26, which forwards the L2 BUM packet to any receivers in customer network 6C.

Because PE 10B stores Ethernet segment routes for each of PEs 10A, 10C, 10D for ESes 14A, 14B for EVI, PE 10B forwards L2 BUM packet 23 on local interfaces for ESes 14A-14B as respective L2 BUM packets 28A-28B.

In accordance with techniques describes herein, in some examples, PE 10B applies a local-bias label 24 to L2 BUM packet 22 when sending to remote PEs 10A, 10C, and 10D. The local-bias label may be included in place of an ESI label in a label stack for L2 BUM packet 22.

PEs 10 each signal a local-bias label for use by ingress PEs for L2 BUM packets to apply when sending L2 BUM packets to remote PEs. In some examples, a PE 10 signals the local-bias label using a local-bias extended community included in an Ethernet A-D per ES route advertised by the PE 10. A PE 10 that receives a local-bias label in an EVPN route may correlate the local-bias label with the sending PE using a NEXT_HOP path attribute included in the EVPN route. In some examples, a PE 10 signals the local-bias label using the ESI label extended community included in an Ethernet A-D per ES route advertised by the PE 10, described in RFC Section 7.5, where the encoding of the ESI label extended community is modified to indicate the ESI label field includes a value for a local-bias label rather than an ESI label. These examples are described further below with respect to FIGS. 5A-5B.

In FIG. 2, PE 10B signals local-bias label 24 in message 25. Message 25 may represent an Ethernet A-D per ES route advertised by PE 10B.

A local-bias label identifies a sending PE to a receiving PE that receives an L2 packet with the local-bias label via intermediate network 12. The local-bias label included with an L2 packet indicates to the receiving PE that the sending PE performed local-bias forwarding for the L2 packet. In response to receiving a local-bias label with an L2 packet, if the receiving PE is a designated forwarder on one or more Ethernet segments 14 for EVI 3, the receiving PE is to forward the L2 packet on each ES of the one or more Ethernet segments 14 so long as the sending PE does not have a local interface for the ES.

The local-bias label differs from an ESI label. An ESI label corresponding to an Ethernet segment of the advertising PE and indicates, to a PE that receives an L2 packet via intermediate network 12 with the ESI label, that the receiving PE is to perform split-horizon filtering of the packet to drop the packet instead of the forwarding the packet to the Ethernet segment corresponding to the ESI label.

In contrast with the ESI label, the local-bias label corresponds to the ingress PE for the L2 packet received via intermediate network 12 and causes the receiving PE, if the receiving PE is a designated forwarder for the L2 packet, to forward the L2 packet on any Ethernet segments for which the ingress PE does not have a local interface while eschewing forwarding of the L2 packet on any Ethernet segments for which the ingress PE does have a local interface.

In the example of FIG. 2 and as described above, PE 10B sends L2 BUM packet 22 with local-bias label 24 to each of PEs 10A, 10C, 10D that provide reachability for ESI 14C. PE 10D, which is a designated forwarder for ES 14C for EVI 3, receives L2 BUM packet 22 with local-bias label 24. Based on the local-bias label 24, PE 10D identifies PE 10B and forwards the L2 BUM packet 22 on Ethernet segments for which PE 10B does not have a local interface. PE 10B may determine Ethernet segments for which PE 10B does not have a local interface based on Ethernet segments routes advertised by PE 10B. Because Ethernet link 17B is failed, PE 10B has withdrawn the Ethernet segment route for ES 14C for EVI 3. Based on not storing an Ethernet segment route for ES 14C for EVI 3, PE 10D is able to determine that PE 10B does not have a local interface for ES 14C for EVI 3. Accordingly, PE 10D forwards the L2 BUM packet 22 as L2 BUM packet 26 on Ethernet segment 14C.

Based on the local-bias label 24 received with L2 BUM packet 22, PE 10D also determines that PE 10B has local interfaces for Ethernet segment 14B, for which PE 10D is a designated forwarder for EVI 3, using a stored Ethernet segment route for Ethernet segment 14B for EVI 3, as advertised by PE 10B. PE 10D therefore does not forward L2 BUM packet 22 on Ethernet segment 14B.

A designated forwarder for Ethernet segment 14A for EVI 3, PE 10A also receives local-bias label 24 with L2 BUM packet 22. Based on the local-bias label 24 received with L2 BUM packet 22, PE 10D determines that PE 10B has local interfaces for Ethernet segment 14A, using a stored Ethernet segment route for Ethernet segment 14A for EVI 3, as advertised by PE 10B. PE 10A therefore does not forward L2 BUM packet 22 on Ethernet segment 14A.

Using the local-bias label as described above, receiving PEs 10 that receive L2 BUM packet 22 with local-bias label 24 may determine from the Ethernet segment topology that the source PE 10B performs local-bias forwarding for Ethernet segments 14 connected to a local interface of source PE 10B and therefore avoid sending a duplicate L2 BUM packet for L2 BUM packet 22 on such Ethernet segments 14. A receiving PE 10 may also send a L2 BUM packet for L2 BUM packet 22 on one or more Ethernet segments 14 for which the receiving PE is designated forwarder for EVI 3 and that source PE does not have local interface for. In this way, all endpoints 4 that are destinations of the L2 BUM packet 23 received by the ingress PE 10B may receive a copy of the L2 BUM packet 23 while facilitating lower latency and latency variability for endpoints 4 that are reachable via a local interface for the ingress PE 10B to Ethernet segments 14A, 14B.

Figure 3:
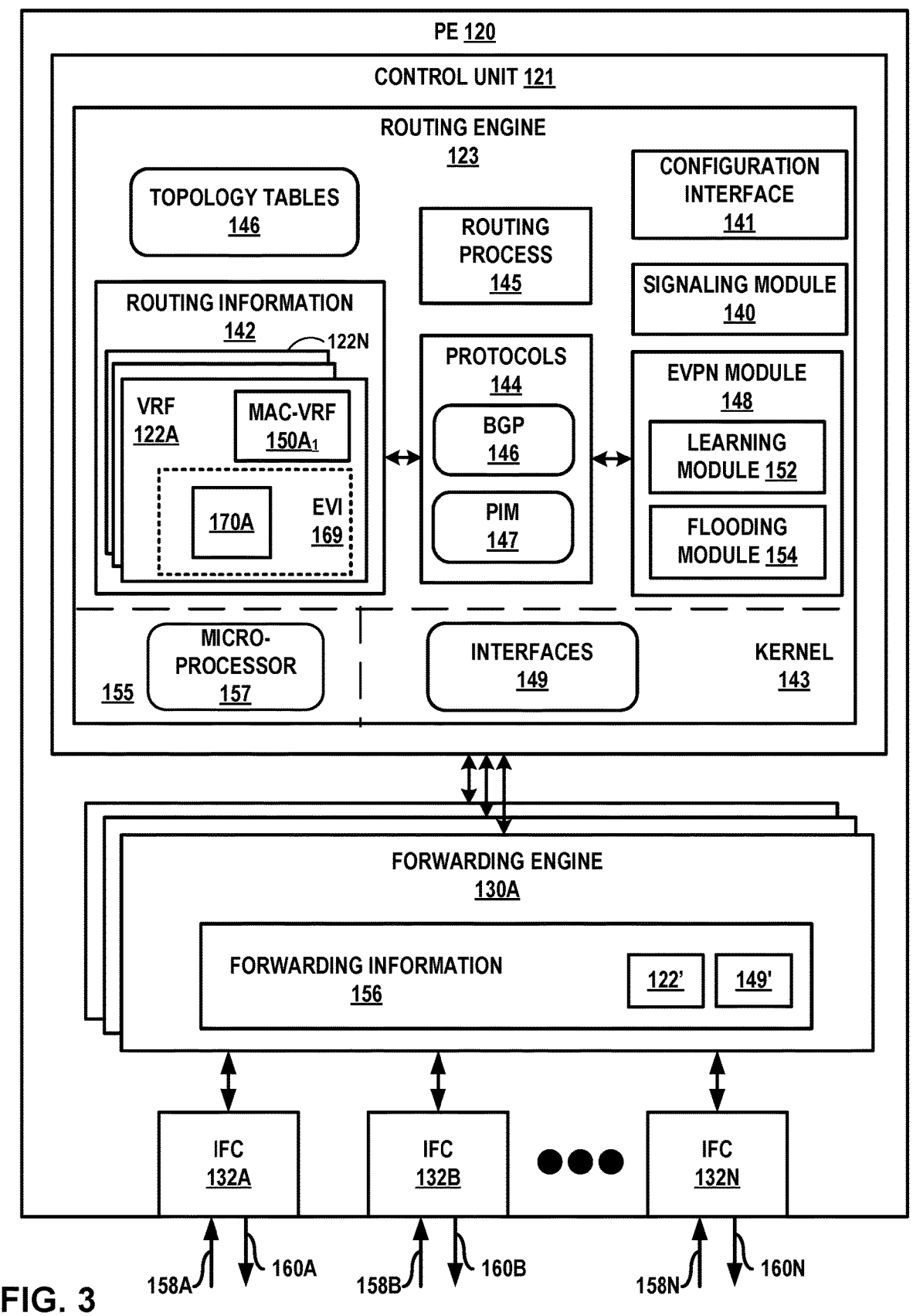
FIG. 3 is a block diagram illustrating further details of a network device that performs local-bias forwarding for L2 BUM packets in an EVPN, in accordance with techniques of the disclosure.

FIG. 3 is a block diagram illustrating further details of a network device that performs local-bias forwarding for L2 BUM packets in an EVPN, in accordance with techniques of the disclosure. PE 120 may represent an example instance of any of PE routers 10 of FIGS. 1-2.

PE 120 includes a control unit 121 that includes a routing engine 123, and control unit 121 is coupled to forwarding engines 130A-130N. Each of forwarding engines 130 is associated with one or more of interface cards 132A-132N ("IFCs 132") that receive packets via inbound links 158A-158N ("inbound links 158") and send packets via outbound links 160A-160N ("outbound links 160"). IFCs 132 are typically coupled to links 158, 160 via a number of interface ports (not shown). Interfaces for inbound links 158 and outbound links 160 may represent physical interfaces, logical interfaces, or some combination thereof. Interfaces for links 158, 160 may represent local interfaces of PE 120 for Ethernet links for one or more Ethernet segments of a network.

Elements of control unit 121 and forwarding engines 130 may be implemented solely in software, or hardware, or may be implemented as combinations of software, hardware, or firmware. For example, control unit 121 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 121 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE 120, e.g., protocols. Control unit 121, in some examples, retrieves and executes the instructions from memory for these aspects.

Routing engine 123 includes kernel 143, which provides a run-time operating environment for user-level processes. Kernel 143 may represent, for example, a UNIX operating system derivative such as Linux or Berkeley Software Distribution (BSD). Kernel 143 offers libraries and drivers by which user-level processes may interact with the underlying system. Hardware environment 155 of routing engine 123 includes microprocessor 157 that executes program instructions loaded into a main memory (not shown in FIG. 3) from a storage device (also not shown in FIG. 3) in order to execute the software stack, including both kernel 143 and processes executing on the operating environment provided by kernel 143. Microprocessor 157 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 143 provides an operating environment for a routing process 145 that executes various protocols 44 at different layers of a network stack, including protocols for implementing Ethernet Virtual Private Networks. For example, routing engine 123 includes network protocols that operate at a network layer of the network stack. In the example of FIG. 3, network protocols include the Border Gateway Protocol (BGP) 146, which is a routing protocol. BGP 146 may include Multiprotocol BGP (MP-BGP). Routing engine 123 may include other protocols not shown in FIG. 3, such as an MPLS label distribution protocol and/or other MPLS protocols. Routing engine 123 is responsible for the maintenance of routing information 142 to reflect the current topology of a network and other network entities to which PE 120 is connected. In particular, routing protocols periodically update routing information 142 to accurately reflect the topology of the network and other entities based on routing protocol messages received by PE 120.

As shown in FIG. 3, PE 120 may be configured with multiple VRFs 122A-122N. Each of VRFs 122 represents a virtual routing and forwarding instance. VRF 122A includes at least one routing table for BGP 146, including EVPN routes 170A to store routes in the EVPN address family. An attachment circuit may be associated with a particular VRF, such as VRF 122A, and the particular VRF may be configured to forward traffic for the attachment circuit. Routing information 142 may store routes for different routing tables using suitable data structures, such as a set, list, and/or database.

Forwarding engines 130A-130N ("forwarding engines 130" or "forwarding units 130") represent hardware and logic functions that provide high-speed forwarding of network traffic. Forwarding engines 130 typically includes a set of one or more forwarding chips programmed with forwarding information 156 that maps network destinations with specific next hops and the corresponding output interface ports. In general, when PE 120 receives a packet via one of inbound links 158, one of forwarding engines 130 identifies an associated next hop for the data packet by traversing the programmed forwarding information 156 based on information within the packet. One of forwarding engines 130 (either the ingress forwarding engine or a different, egress forwarding engine) forwards the packet on one of outbound links 160 mapped to the corresponding next hop. Kernel 143 may generate forwarding information 156 to include representations of information stored to VRFs 122 and interfaces 149 in the form of forwarding information 122', 149' for optimized forwarding by forwarding engines 130.

In the example of FIG. 3, forwarding engine 130A includes forwarding information 156. In accordance with routing information 142, forwarding engine 130A stores forwarding information 156 that maps packet field values to next hops and corresponding outbound interface ports 160. For example, routing engine 123 analyzes routing information 142 and generates forwarding information 156 in accordance with routing information 142. Forwarding information 156 may be maintained in the form of one or more tables, link lists, radix trees, databases, flat files, or any other data structures. Routing information 142 includes EVPN routes 170A.

Forwarding engine 130A maintains forwarding information 156 for each Ethernet VPN Instance (EVI) established by PE 120 to associate network destinations with specific next hops and the corresponding interface ports. As described in FIGS. 1-2, an EVI may be associated with one or more Ethernet Segments. In general, when PE 120 receives a data packet from an Ethernet Segment via one of inbound links 58, forwarding engine 130A, for example, identifies an associated next hop for the data packet by traversing forwarding information 156 based on information (e.g., labeling information) within the packet. Forwarding engine 130A forwards the data packet on one of outbound links 160 to the corresponding next hop in accordance with forwarding information 156 associated with the Ethernet segment. At this time, forwarding engine 130A may push and/or pop labels from the packet to forward the packet along a correct LSP.

Signaling module 140 outputs control plane messages to automatically establish tunnels to interconnect multiple PE devices including PE 120 and otherwise provision one or more EVIs configured for PE 120 and other PEs. Signaling module 140 may signal the PE routers using one or more suitable tunnel signaling protocols, such as GRE, VXLAN, and/or MPLS protocols. Signaling module 140 can communicate with forwarding engine 130A to automatically update forwarding information 156. In some examples, signaling module 140 may be part of or executed by routing process 145.

Routing engine 123 also includes a configuration interface 141 that receives and may report configuration data for PE 120. Configuration interface 141 may represent a command line interface; a graphical user interface; Simple Network Management Protocol (SNMP), Netconf, or another configuration protocol; or some combination of the above in some examples. Configuration interface 141 receives configuration data configuring the PE 120 with VRFs 122, interfaces 149, EVI 169, and other constructs that at least partially define the operations for PE 120. PE 120 may store configuration data to a storage device (not shown). EVI 169 may represent a local configuration for PE 120 for EVI 3 of FIGS. 1-2.

Routing engine 123 also includes an EVPN module 148 having flooding module 154 that performs flooding and a learning module 52 that performs layer two (L2) learning. Learning module 152 may perform remote learning using BGP 146. EVPN module 148 may maintain MAC-VRFs 150 for each EVI established by PE 120, or in alternative examples may maintain one or more MAC tables that are independent of each respective EVI. MAC-VRF 150A$_1$, for instance, may represent a virtual routing and forwarding table of VRFs 122A for an EVI configured for VRF 122A. Learning module 152 and flooding module 154 may alternatively be configured for execution, in full or in part, by forwarding engine 130A. In some examples, EVPN module 148 may be part of or executed by routing process 145. Learning module 152 may perform MAC/IP binding learning by, e.g., using MAC and IP address information received by PE 120 in ARP or NDP messages.

Learning module 152 may detect a new MAC address on an EVI access interface for an EVI and add the MAC address, with a mapping to the EVI access interface, to MAC-VRF 150A$_1$ for the EVI. Learning module 152 may then advertise an EVPN MAC/IP advertisement route (or "MAC advertisement route") using BGP 146 to remote PEs. The MAC advertisement route includes a route target corresponding to the EVI, the MAC address, the Ethernet tag for the bridge domain in which the MAC address was learned, the ESI in which the MAC address was learned, the IP address corresponding to the MAC address (if known), and a MAC label. With remote MAC learning, learning module 152 may receive an EVPN MAC/IP advertisement route from another PE and install a host route for the IP address (if included) with protocol type EVPN to the appropriate VRF 122 for the EVI and install the MAC address in the MAC-VRF 150 of the EVI, as well as the MAC information associated with the host route in the VRF 122 including the EVPN label.

Forwarding engine 130A receives data packets on inbound links 158 that are destined for one of the PEs in the EVPN. Forwarding engine 130A determines whether the destination customer MAC address of the data packets is included in the one of MAC-VRFs 150 associated with the EVPN. If the MAC address is included in the one of MAC-VRFs 150, then PE 120 forwards the data packets to the destination PE router according to information in the MAC-VRF 150 based on forwarding information 56 associated with the EVPN. If the customer MAC address is not included in the one of MAC-VRFs 150, PE 120 floods the data packets to all of the PE routers based on forwarding information 156 associated with the EVPN. Further example details of remote and local MAC learning for EVPN is described in RFC 7432.

EVPN module 148 additionally manages the EVPN multi-homing mode of operation for PE 120. That is, EVPN module 148 operates to maintain EVPN service and traffic forwarding to and from CEs multi-homed to PE 120 and one or more other routers. For example, in the event of a network failure such as a PE 120 to CE Ethernet link failure; a failure of PE 120; or an MPLS-reachability or other type of tunneling failure between PE 120 and a remote PE 10; EVPN module 48 may coordinates with PEs 10 to ensure that one of PEs 120, 10 is in an active mode. EVPN module 148 may coordinate with other PEs 10 to elect a new designated forwarder for an Ethernet segment 14 for EVI 3.

Kernel 143 includes an interfaces table 149 ("interfaces 149") that represents a data structure that includes a corresponding entry for each logical interface configured for PE 120. Logical interfaces may correspond to local interfaces of PE 120 for Ethernet segments 14. Entries for respective logical interfaces may specify respective current information describing the logical interfaces.

Routing process 145 may generate EVPN routes and send and receive, via BGP 146 sessions with other PEs and/or one or more route reflectors, EVPN routes. Routing process 145 may store generated EVPN routes and import/store received EVPN routes to a route table storing EVPN routes 170A for EVI 169. Learning module 152 may install remotely-learned MAC address information to MAC-VRF 150A$_1$ and to VRF 122A as described above for remote MAC learning.

Routing process 145 may generate and output at least one EVPN Ethernet Segment route that advertises each Ethernet segment for which PE 120 has a local interface. Routing process 145 may also import Ethernet Segment routes advertised by remote PEs, each Ethernet Segment route advertising an Ethernet segment for which the remote PE has a local interface. Routing process 145 may store the advertised and imported Ethernet Segment routes to EVPN routes 170A. Because Ethernet Segment routes may have a scope of all EVIs configured for PE 120, routing process 145 may store Ethernet Segments to a common routing table usable for multiple EVIs configured for PE 120.

Routing process 145 may generate and output at least one Ethernet A-D per ES route for EVI 169 that includes a local-bias label for PE 120. Routing process 145 may also import respective Ethernet A-D per ES routes advertised by one or more remote PEs and including respective local-bias labels for the one or more remote PEs. Routing process 145 may store the advertised and imported one Ethernet A-D per ES routes to EVPN routes 170A.

EVPN module 148 configures forwarding engines 130 to perform local-bias forwarding for L2 BUM packets for EVI 169 received by PE 120 on a local interface for an Ethernet segment. For example, based on EVPN routes 170A for EVI 169, EVPN module 148 generates respective topology tables 146 for one or more remote PEs also configured with EVI 169.

Each of topology tables 146 for EVI 169 indicates, for a corresponding remote PE, Ethernet segment reachability for the remote PE and for PE 120 for one or more Ethernet segments for EVI 169. For example, a topology table 146 may indicate, for PE 10D of FIGS. 1-2, multiple Ethernet segments advertised by PE 10D in corresponding Ethernet A-D per ES (Type 1) EVPN routes for EVI 169, received by PE 120 and stored to EVPN routes 170A. The topology table 146 for PE 10D may further indicate, for each of the multiple Ethernet segments advertised by PE 10D, whether PE 120 stores an Ethernet Segment (Type 4) EVPN route for the Ethernet segment in EVPN routes 170A.

Based on topology tables 146 for the one or more remote PEs, PE 120 programs forwarding information 156 to cause packet forwarding engines 130 to perform local-bias forwarding of L2 BUM traffic for EVI 169. For example, PE 120 may use the respective topology tables 146 to determine whether to replicate L2 BUM traffic for EVI 169 via an intermediate network to the remote PEs, and PE 120 may program forwarding information 156 to cause forwarding engines 130 to forward L2 BUM traffic for EVI 169 using local interfaces of PE 120 for Ethernet segments and/or to send L2 BUM traffic for EVI 169 to one or more remote PEs, via an intermediate network, for replication on Ethernet segments for which PE 120 does not have a local interface.

A representation of topology table 146 may be downloaded to forwarding engines 130 for use in determining whether to selectively forward BUM traffic to a remote PE. For example, kernel 143 may generate forwarding information 156 to include representations of topology tables 146 to cause forwarding engines 130 to perform local-bias forwarding of L2 BUM traffic for configured EVIs and determine whether to selectively forward the L2 BUM traffic via an intermediate network to remote PEs, as described in this disclosure, and according to the topology tables 146.

In some examples, forwarding information 156 may be programmed to cause forwarding engines 130 to perform local-bias forwarding using forwarding filters applied to next-hop PEs, or by modifying a next-hop replication list for ingress replication for L2 BUM traffic. L2 multicast traffic may be forwarded according to a different next-hop replication list for each multicast core tree corresponding to different multicast groups. The forwarding information 156 may further include one or more next-hops for local interfaces of PE 120.

For example, forwarding information 156 may include a route configured to replicate L2 packets to multiple endpoint receivers, via remote PEs. The route may be for L2 multicast packets. A next-hop replication list of the route may point to two sub-lists: the list of the Ethernet segments {ESI 14A, ESI 14B, ESI 14C, . . . } and the list of the PEs that have joined the core tree (either Type-3 IMET or Type-6 SMET route signaling) (PE 10A, PE 10C, PE 10D, . . . ).

EVPN module 148 may generate a topology table 146 per remote PE by correlating EVPN Ethernet A-D per ES routes with EVPN Ethernet Segment routes from the remote PEs. Using the topology tables 146, EPVN module 148 may determine whether there is any link failure that prevents PE 120 from doing local-bias forwarding for all receivers in the fabric. If all receivers are behind fully-meshed local interfaces, PE 120 may install a forwarding filter to forwarding information 156 (or alternatively could remove the remote PEs from the next-hop list of forwarding information 156 for the route) to not replicate traffic to any of the remote PEs, and instead to cause forwarding engines 130 to replicate L2 BUM traffic for EVI 160 to local interfaces for the fully-meshes Ethernet segments 14.

If, however, EVPN module 148 determines that there is an Ethernet segment for EVI 169 connected to another remote PE for which there is no local interface or for which there is a link failure on PE 120, PE 120 is unable to do local-bias forwarding for the Ethernet segment. EVPN module 148 therefore removes (or does not configure) the forwarding filter installed to forwarding information 156 for the remote PE for ingress replication for EVI 169 (or alternatively adds the remote PE to the next-hop list of forwarding information 156 for the route).

If a single topology table 146 is common to all remote PEs and the list of PEs for a multicast route was built based on Inclusive Multicast Ethernet Tag (IMET) signaling, any failure of an Ethernet segment may result in traffic replicated in the intermediate network interconnecting PEs. However, if a single topology table 146 is common to all remote PEs and the list of PEs is built based on Selective Multicast Ethernet Tag (SMET) signaling, only remote PEs that have receivers behind the Ethernet segments for the multicast route that PE 120 cannot reach will be present.

In general, the implementation of the topology tables 146 and corresponding filter/next-hop list may be done at the granularity of a given destination PE in the PE sub-list if external PEs need to be connected to the fabric. In that case, an external PE is not connected to a fabric Ethernet segment 14 but may be added to the PE sub-list via IMET or SMET route signaling. The external PE may be excluded from the PE filter by computing topology tables 146 for specific PE next-hops, such as only PEs that have advertised any of Ethernet segments 14, and applying the corresponding PE filter from a topology table 146 only for the corresponding PE. Since an external PE is not connected to and does not advertise any of the Ethernet segments 14, the external PE does not have an topology table, and hence does not get filtered.

In some examples, PE 120 may further program forwarding information 156 to cause forwarding engines 130 to send the L2 BUM traffic for EVI 169 to one or more remote PEs with corresponding local-bias labels advertised by the one or more remote PEs. PE 120 may obtain the local-bias labels from Ethernet A-D per ES routes imported by routing process 145 and stored to EVPN routes 170A for EVI 169.

Including the local-bias label with an L2 BUM packet sent to a remote PE via an intermediate network may enable the remote PE to avoid sending the L2 BUM packet to an Ethernet segment 14 that was a source of the traffic and, at least in some instances, sending the L2 BUM packet on any Ethernet segment 14 for which the sending PE has a local interface. In this way, PEs including PE 120 may perform achieve split-horizon forwarding.

As described above, routing process 145 may receive a local-bias label in an EVPN route advertised by the remote PE. In response to receiving the local-bias label, EPVN module 148 may program forwarding information 156 with a label operation for the local-bias label to perform a local-bias check. In some cases, the local-bias check causes forwarding engines 130 to check for local-bias for each Ethernet segment 14 for which PE 120 is a designated forwarder for EVI 169. Based on local-bias label included with an L2 packet received at forwarding engine 130A, forwarding engine 130A may identify the source PE for the local-bias label (and the L2 packet), then determine, using the topology table 146 information for the source PE whether the source PE would have already sent traffic to a given Ethernet Segment using local-bias forwarding. In some examples, a representation of topology table 146 may be downloaded to forwarding engines 130 for use by the receiving PE 120 to determine whether to selectively forward BUM traffic onto each Ethernet segment 14 for which PE 120 has a local interface and is a designated forwarder for EVI 169. For example, kernel 143 may generate forwarding information 156 to include representations of topology tables 146 to cause forwarding engines 130 to perform a local-bias check of L2 BUM traffic for EVI 169 being received from a source PE and determine whether to selectively forward the L2 BUM traffic for the EVI 169. In this way, the receiving PE 120 for the L2 BUM packet may avoid duplicating forwarding of the L2 BUM packet on Ethernet segments 14 for which the source PE has local interfaces and thus already forwarded the L2 BUM packet using local-bias forwarding described herein.

Although a single local-bias label per PE is sufficient to identify a source PE and implement the above-described local-bias check for split-horizon forwarding, in some examples, when PE 120 is configured in local-bias mode in configuration data for EVI 169, PE 120 may use a local-bias label in place of the ESI label, per RFC 7432, in both BGP signaling and in MPLS label imposition. That is, PE 120 may allocated the local-bias label on a per-ES basis such that there is one local-bias per ESI advertised by each PE. Signaling of the local-bias label in an Ethernet A-D per ES route may inherit the advertisement scope from the ES-import route-target included in the Ethernet A-D per ES route. However, the Ethernet A-D per ES route changes the meaning of the standard ESI label to an upstream-allocated label, while keeping the standard ESI label's signaling, advertisement scope, and label stack imposition intact. For example, PE 120 may encode a local-bias label in an ESI label extended community of an Ethernet A-D per ES route and use a bit of the flag field or one of the reserved fields to indicate that the label included in the "ESI label" field of the ESI label extended community is a local-bias label. However, in some examples, PE 120 may advertise a common local-bias label for EVI 169 in all Ethernet A-D per ES routes advertised by PE 120 for EVI 169. In some examples, PE 120 may advertise a local-bias label in an Ethernet A-D per ES route by including the local-bias label in a new local-bias label BGP community or local-bias label BGP extended community.

PE 120, upon receiving an Ethernet A-D per ES route extended in one of these ways to include a local-bias label, may extract the local-bias label and use it in the manner described herein when forwarding L2 BUM traffic for EVI 169 to the PE that advertised the route.

In cases in which the PE 120 is configured with a P2MP tunnel replication model rather than ingress replication, PE 120 may configure forwarding information 156 with underlay P2MP replication trees for L2 BUM traffic for EVI 169. If PE 120 is unable to perform local-bias forwarding for all Ethernet segments 14 having receivers for an L2 BUM packet, PE 120 may be unable to perform replication filtering for remote PEs because PE 120 does not control the underlay P2MP replication trees. In this case, PE 120 may still perform local-bias forwarding on local interfaces of PE 120 for Ethernet segments 14. PE 120 may use the upstream-allocated P2MP ESI label, per RFC 7432, for split-horizon forwarding (i.e., without using a local-bias label).

FIG. 4A depicts an example topology table for implementing local-bias forwarding, according to techniques described in this disclosure. Topology table 300A may represent an example of topology tables 146 of FIG. 3 and includes values for the topology of system 2 as shown in FIG. 1. In his example, topology table 300A is generated by PE 10B for the topology of system 2 and in particular for PE 10D.

A remote PE 10 (or an external PE) configured with EVI 3 advertises EVPN A-D per ES routes (Type-1) routes for EVI 3. Such EVPN A-D per ES routes have a scope of EVI 3. When received by PE 10B, the EVPN A-D per ES routes advertised by one or more remote PEs provide 10B with indications of the Ethernet segments 14 (and/or remote Ethernet segments via a WAN) connected to remote PEs that are to receive L2 traffic for EVI 3.

In accordance with the techniques described herein, PE 10B sends traffic to a remote PE advertising an Ethernet segment 14 only if PE 10B is unable to forward the traffic on a local interface of PE 10B for the 14 Ethernet segment, per local-bias forwarding. PE 10B determines that it is unable to reach an Ethernet segment if PE 10B has not received, from a remote PE, an EVPN Ethernet Segment (Type-4) route specifying the ESI for the Ethernet segment but has received, from the remote PE, EVPN A-D per ES route specifying the ESI. (The PE 10B does not receive the EVPN Ethernet Segment route in this because PE 10B is not itself connected to the Ethernet segment and withdraws EVPN Ethernet Segment route (Type-4) interest for the Ethernet segment from the BGP control plane (EVPN ES routes have Ethernet segment scope).

Using the received EVPN A-D per ES and EVPN ES routes, PE 10B may compute a topology table for one or more remote PEs 10A, 10C, 10D. In some cases, PE 10B may compute a topology table for each remote PE 10A, 10C, 10D in a multicast next-hop list. Topology table 300A represents a topology table computed by PE 10B for remote PE 10D. Because system 2 is fully-meshed in FIG. 1, PE 10B receives and stores, for each of ESIs 14, both an EVPN A-D per ES and ES route advertised by PE 10D specifying the ESI.

PE 10B thus generates topology table 300A to include a list of ESIs for Ethernet segments 14, i.e., ESI_14A, ESI_14B, and ESI_14C, advertised for EVI 3. For each ESI, the corresponding row of topology table 300A indicates (with a Boolean TRUE or FALSE value) whether PE 10B stores an EVPN A-D per ES and ES route advertised by PE 10D specifying the ESI. PE 10B may correlate the EVPN A-D per ES and ES route advertised by PE 10D specifying the ESI by matching the ESIs in each route for routes having a common BGP NEXT_HOP path attribute, as defined in RFC 4271, "A Border Gateway Protocol 4 (BGP-4)," Network Working Group, January, 2006, which is incorporated by reference herein in its entirety. For example, PE 10B may identify an ES route advertised by PE 10D (as indicated by the BGP NEXT_HOP attribute for the ES route) specifying an ESI, then determine whether PE 10B stores an EVPN A-D per ES route for the ESI that is advertised by PE 10D (again, as indicated by the BGP NEXT_HOP attribute for the EVPN A-D per ES).

Using topology table 300A, PE 10B determines that PE 10B may perform local-bias forwarding to forward an L2 BUM packet received for EVI 3 (e.g., L2 BUM packet 13) on respective local interfaces of PE 10B for all ESIs 14. More specifically, because PE 10B stores (TRUE) an ES route from remote PE 10D for all ESIs advertised by remote PE 10D (as indicated by the A-D per ES routes), PE 10B has a local interface for all ESIs advertised by the remote PE 10D and does not need to send an L2 BUM packet to remote PE 10D. Accordingly, PE 10B configures a forwarding filter to block replication on an ingress replication or P2MP route for EVI 3 (or removes remote PE 10D from a next-hop list for the L2 BUM packet).

FIG. 4B depicts an example topology table for implementing local-bias forwarding, according to techniques described in this disclosure. Topology table 300B may represent topology table 300A as modified by PE 10B due EVPN route signaling after a failure of Ethernet link 17B, per the topology of system 2 of FIG. 2.

The entry for Ethernet segment 14C ("ESI_14C") of topology table 300B, generated by PE 10B for remote PE 10D, indicates that PE 10B does not store an Ethernet Segment route for Ethernet segment 14C. As a result, PE 10B determines to send subsequent L2 BUM packets (e.g., L2 BUM packet 23) to remote PE 10D, because topology table 300B indicates that PE 10B does not have a local interface for Ethernet segment 14C and is unable to perform local forwarding on Ethernet segment 14C. Accordingly, PE 10B removes any existing forwarding filter configured to block replication on an ingress replication or P2MP route for EVI 3 (or configures remote PE 10D on a next-hop list for the L2 BUM packet).

Figure 5A:
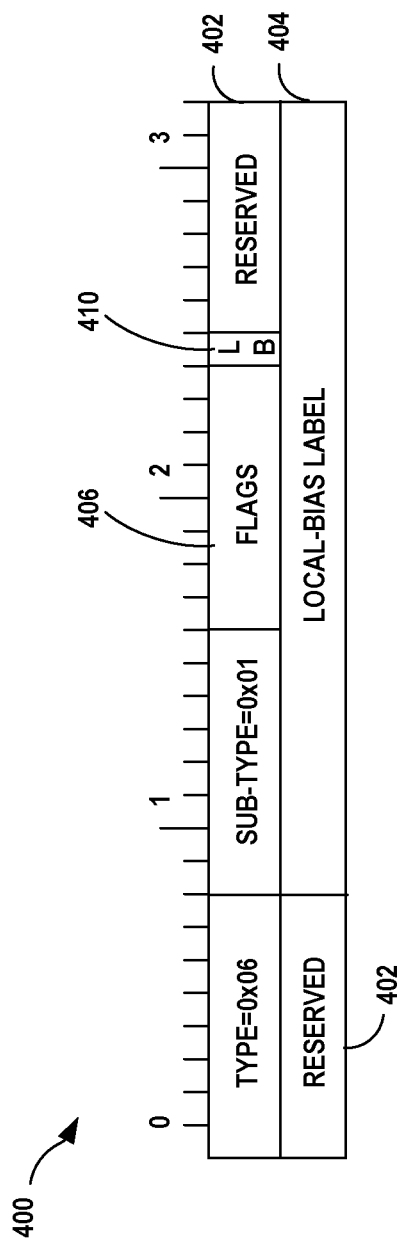
FIG. 5A is a block diagram illustrating an example Border Gateway Protocol community that includes a local-bias label, according to techniques described in this disclosure.

FIG. 5A is a block diagram illustrating an example Border Gateway Protocol community that includes a local-bias label, according to techniques described in this disclosure. Example BGP community 400 (hereinafter, "community 400") may represent a BGP community or a BGP extended community that is included as a path attribute for Network Layer Reachability Information (NLRI) advertised in a Multi-Protocol BGP UPDATE message. MP-BGP and BGP extended communities are described in "Multiprotocol Extensions for BGP-4," IETF Network Working Group, Request for Comments (RFC) 4760, January 2007; and "BGP Extended Communities Attribute", IETF Network Working Group, Request for Comments (RFC) 4360, February, 2006; each of which being incorporated by reference in their entireties.

Community 400 has Type field value of 0x06 and a Sub-Type field value of 0x01, which identifies the BGP community as an ESI Label Extended Community. Community 400 is extended from the ESI Label Extended Community described in RFC 7432, Section 7.5, to include an indication that the ESI label field (here, relabeled as a Local-Bias Label field 404) of community 400 includes a local-bias label and not an ESI label. That is, the value of Local-Bias Label field 404 is a local-bias label for the PE advertising the route that has the community 400 path attribute, per the indication included in the community 400. In this example, a local-bias bit 410 of reserved field 402 defined in RFC 7432, Section 7.5 is the indication the ESI label field includes a local-bias label. In some examples, the indication may be a local-bias bit of flags field 406, for instance.

Figure 5B:
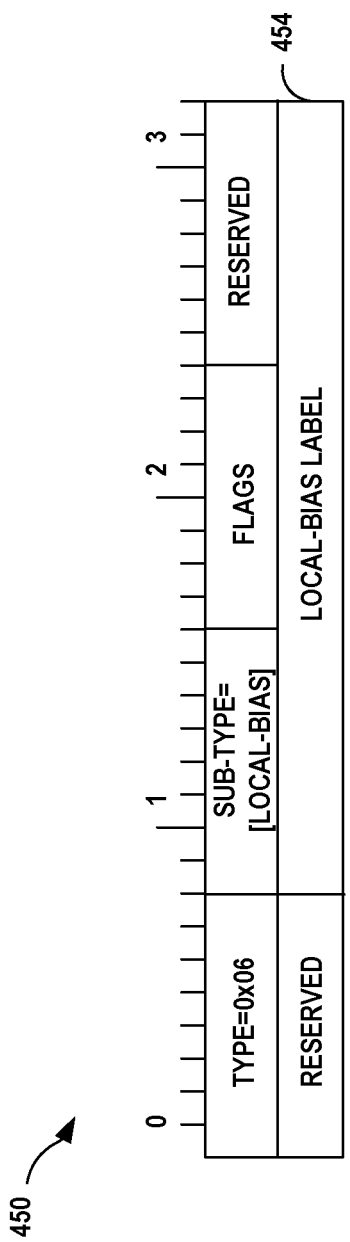
FIG. 5B is a block diagram illustrating an example Border Gateway Protocol community that includes a local-bias label, according to techniques described in this disclosure.

FIG. 5B is a block diagram illustrating an example Border Gateway Protocol community that includes a local-bias label, according to techniques described in this disclosure. Example BGP community 450 (hereinafter, "community 450") may represent a BGP community or a BGP extended community that is included as a path attribute for Network Layer Reachability Information (NLRI) advertised in a Multi-Protocol BGP UPDATE message. Community 450 has Type field value of 0x06 and a Sub-Type field value that identifies the BGP community as is a Local-Bias extended community that includes a local-bias label field 454. That value of local-bias label field 454 is a local-bias label for the PE advertising the route that has the community 450 path attribute.

The NLRI of a BGP UPDATE message that includes any of communities 400, 450 may be an MP-REACH-NLRI of a BGP UPDATE message that specifies an Address Family Identifier (AFI) of 25 and a value for the Subsequent AFI (SAFI) of 70 to identify the NLRI as EVPN NLRI carrying an EVPN route. The AFI and SAFI may in some instances have different values, as assigned by a private party or by the Internet Assigned Numbers Authority (IANA).

FIG. 6 depicts an example topology table for implementing local-bias forwarding, according to techniques described in this disclosure. Topology table 600 may represent an example of topology tables 146 of FIG. 3 and includes values for the topology of system 2 as shown in FIG. 1. In his example, topology table 600 is generated by PE 10D for the topology of system 2 and in particular for PE 10B. Whereas topology tables 300A-300B of FIGS. 4A-4B may represent a local interface topology for PE 10D as computed by PE 10B, topology table 600 may represent a local interface topology for PE 10B as computed by PE 10D for the example topology of system 2 for FIG. 1B with failed Ethernet link 17B.

Because PE 10B has withdrawn its ES route for ES 14C (ES (Type 4)=NO), topology table 600 indicates that PE 10B does not have an operative local interface for ES 14C. PE 10D may receive an L2 BUM packet with a local-bias label previously advertised by 10B to indicate that PE 10B has applied local-bias forwarding for the L2 BUM packet. Operations of PE 10D are described hereinafter for FIG. 6 with respect to detailed example PE 120 of FIG. 3. PE 120 may program forwarding information 156 with a label operation for the local-bias label to perform a local-bias check. In some cases, the local-bias check causes forwarding engines 130 to check for local-bias for each Ethernet segment 14 for which PE 120 is a designated forwarder for EVI 169.

Based on the local-bias label received with the L2 BUM packet received by PE 10D/120 at forwarding engine 130A, forwarding engine 130A may identify the source PE for the local-bias label (and the L2 BUM packet) as PE 120, then determine, using topology table 600 information for PE 10B whether PE 10B would have already sent traffic to a given Ethernet Segment using local-bias forwarding. Topology table 600 indicates that PE 10B has already performed local-bias forwarding for Ethernet segments 14A, 14B but not for Ethernet segment 14C. Because PE 10D/120 is a designated forwarder for ES 14C, forwarding engine 130 applies forwarding information 156 to forward the L2 BUM packet on Ethernet segment 14C. In this way, the receiving PE 120 for the L2 BUM packet may avoid duplicating forwarding of the L2 BUM packet on Ethernet segments 14 for which PE 10B has local interfaces and thus already forwarded the L2 BUM packet using local-bias forwarding described herein.

Figure 7:
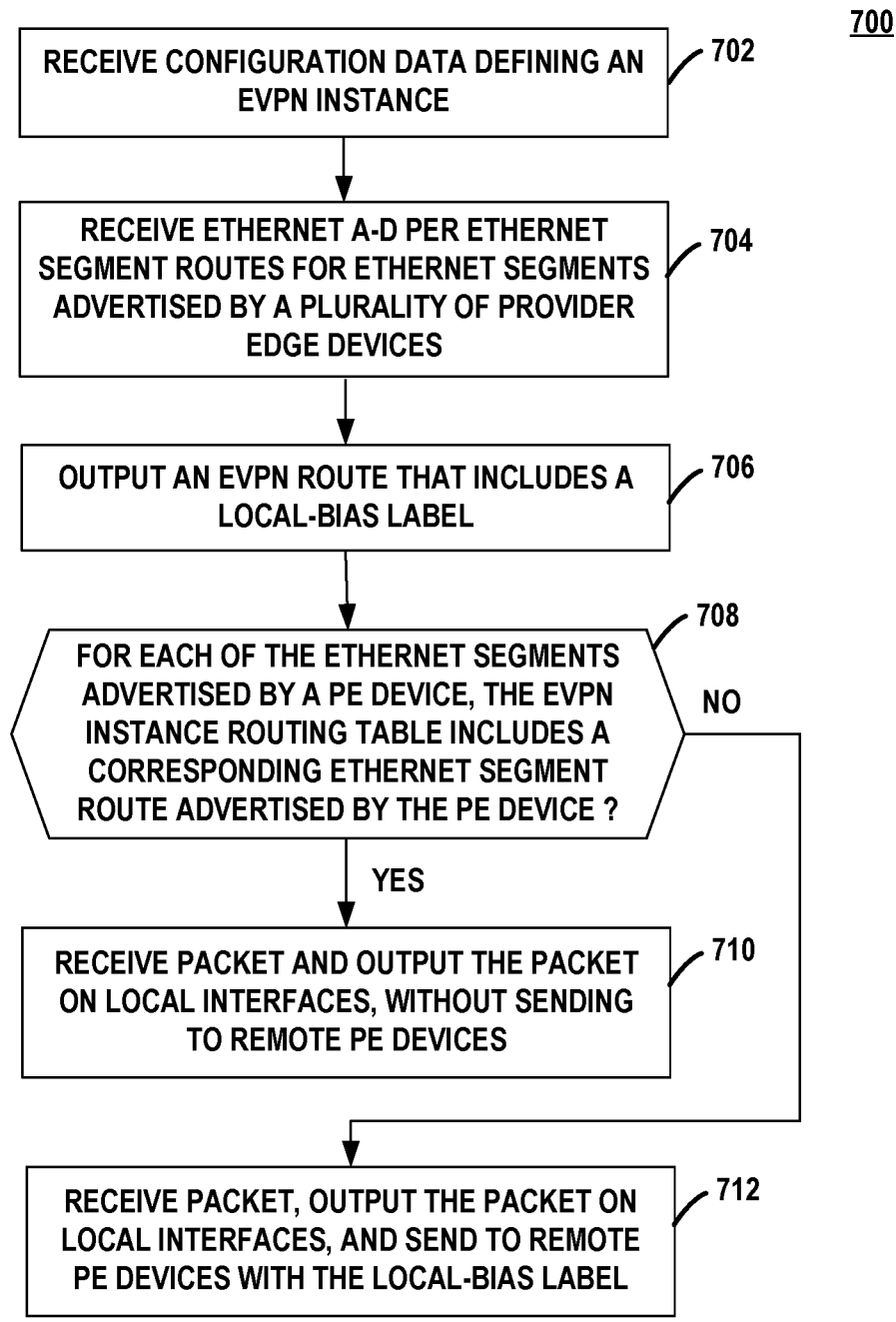
FIG. 7 is a flowchart illustrating an example mode of operation for a provider edge network device to perform local-bias forwarding, in accordance with techniques of this disclosure.

FIG. 7 is a flowchart illustrating an example mode of operation for a provider edge network device to perform local-bias forwarding, in accordance with techniques of this disclosure. Operation 700 is described with respect to PE 120 operating as PE 10B of FIGS. 1-2. Configuration interface 141 may execute NETCONF or other protocol to receive configuration data defining EVPN instance 169 having a routing table 170A to store EVPN routes for the EVPN instance 169 (702). Routing process 145 executes BGP 146 to generate and receive EVPN routes for the EVPN instance 169, which PE 120 stores to routing table 170A. More particularly, routing process 145 generates EVPN Ethernet A-D per ES routes and receives EVPN Ethernet A-D per ES routes advertised by one or more remote PE devices also configured with EVPN instance 169, each of the Ethernet A-D per ES routes advertising, by one or the PEs, an Ethernet Segment for the EVPN instance 169 (704).

Routing process 145 generates an EVPN Ethernet A-D per ES route (or other EVPN route) to advertise a local-bias label that identifies PE 120. Routing process 145 outputs the EVPN route that includes the local-bias label, e.g., in a BGP extended community attribute using BGP 146 (706).

Based on the generated and received EVPN routes for EVPN instance 169, EVPN module 148 identifies advertised Ethernet segments for the EVPN instance 169 using ESIs of Ethernet A-D per ES routes, for instance. EVPN module 148 then attempts to correlate, for Ethernet A-D per ES routes received from a PE device and specifying an ESI, whether an Ethernet Segment route specifying the same ESI from the PE device is stored to routing table 170A. EVPN module 148 may generate and use a topology table 146 for the remote PE for the EVPN instance 169, as described with respect to FIGS. 5A-5B. If a corresponding ES route is not stored for each of the Ethernet A-D per ES routes (NO branch of 708), EVPN module 148 configures forwarding information 156 to output received L2 BUM packets for the EVPN instance 169 on local interfaces and to send L2 BUM packets for the EVPN instance 169 via the intermediate network 3 to the PE device. That is, subsequently, forwarding engine 130 may receive a packet on an Ethernet segment and perform local-bias forwarding to output the packet on local interfaces of PE 120 and also to send the packet to the remote PE with the local-bias label applied (712).

If routing table 170A stores an Ethernet segment route from a remote PE device for all Ethernet A-D per ES routes from the remote PE device (YES branch of 708), EVPN module 148 configures forwarding information 156 to output received L2 BUM packets for the EVPN instance 169 on local interfaces but to block or otherwise eschew sending L2 BUM packets to the remote PE device. That is, subsequently, forwarding engine 130 may receive a packet on an Ethernet segment and perform local-bias forwarding to output the packet on local interfaces of PE 120 but not to send the packet to the remote PE (710).

Figure 8:
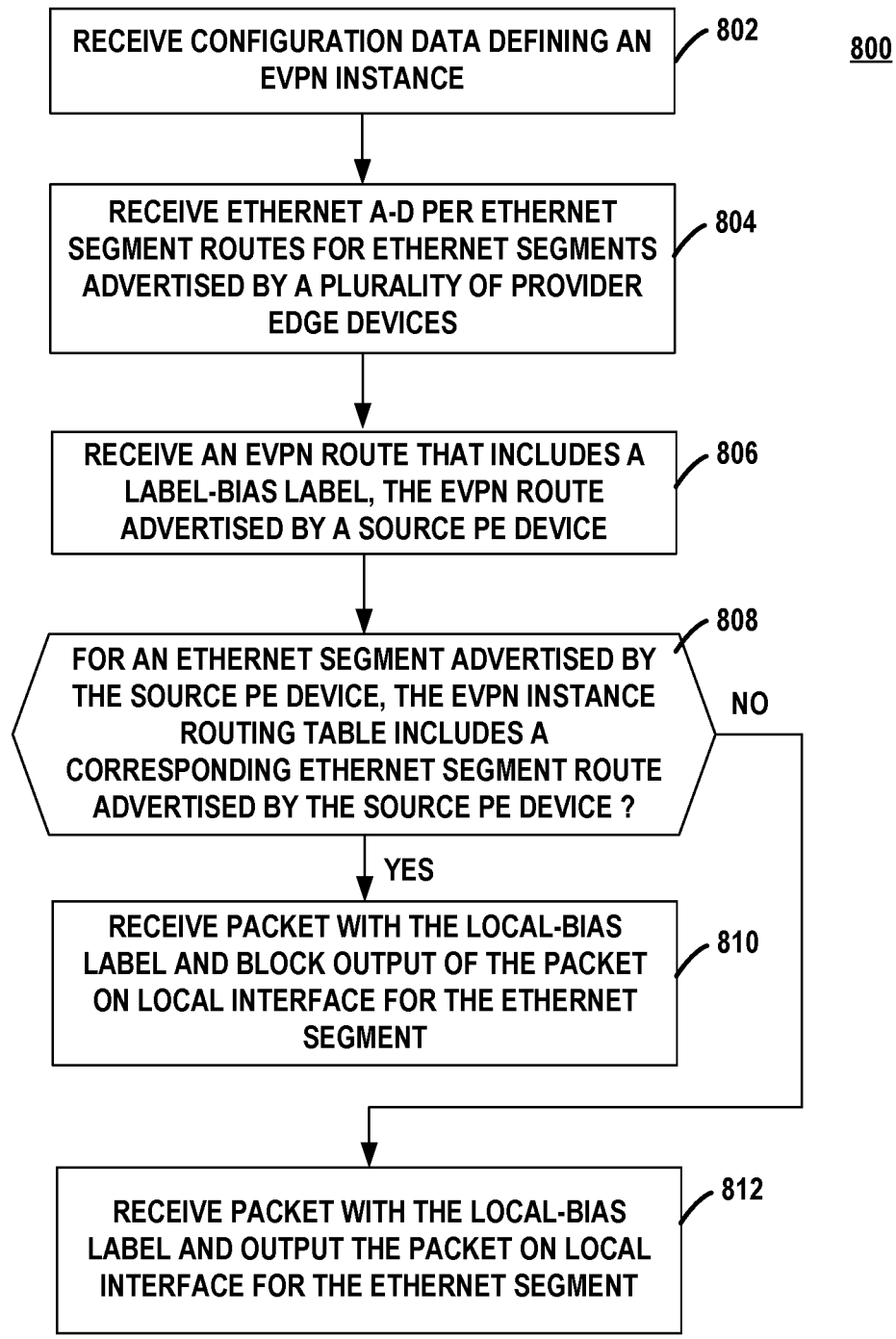
FIG. 8 is a flowchart illustrating an example mode of operation for a provider edge network device to perform local-bias forwarding, in accordance with techniques of this disclosure.

FIG. 8 is a flowchart illustrating an example mode of operation for a provider edge network device to perform local-bias forwarding, in accordance with techniques of this disclosure. Operation 800 is described with respect to PE 120 operating as PE 10B of FIGS. 1-2. Configuration interface 141 may execute NETCONF or other protocol to receive configuration data defining EVPN instance 169 having a routing table 170A to store EVPN routes for the EVPN instance 169 (802). Routing process 145 executes BGP 146 to generate and receive EVPN routes for the EVPN instance 169, which PE 120 stores to routing table 170A. More particularly, routing process 145 generates EVPN Ethernet A-D per ES routes and receives EVPN Ethernet A-D per ES routes advertised by one or more remote PE devices also configured with EVPN instance 169, each of the Ethernet A-D per ES routes advertising, by one or the PEs, an Ethernet Segment for the EVPN instance 169 (804). Routing process 145 receives an EVPN Ethernet A-D per ES or other EVPN route, advertised by a remote PE configured with the EVPN instance 169, that includes a local-bias label for the remote PE for the EVPN instance 169 (806).

Based on the received EVPN routes for EVPN instance 169 advertised by the remote PE, EVPN module 148 identifies advertised Ethernet segments for the EVPN instance 169 using ESIs of Ethernet A-D per ES routes, for instance. EVPN module 148 then attempts to correlate, for Ethernet A-D per ES routes received from the remote PE device and specifying an ESI, whether an Ethernet Segment route specifying the same ESI from the remote PE device is stored to routing table 170A. EVPN module 148 may generate and use a topology table 146 for the remote PE for the EVPN instance 169, as described with respect to FIG. 6. If a corresponding ES route is not stored for one of the Ethernet A-D per ES routes and PE 120 is a designated forward for the ESI specified by the Ethernet A-D per ES route (NO branch of 808), EVPN module 148 configures forwarding information 156 to output L2 BUM packets for the EVPN instance 169, received with the local-bias label via intermediate network 3, on a local interface for the Ethernet segment identified by the ESI. That is, subsequently, forwarding engine 130 may receive a packet with the local-bias label and perform local-bias forwarding to output the packet on a local interface of PE 120 (812).

If routing table 170A stores an Ethernet segment route from the remote PE device for the Ethernet A-D per ES routes from the remote PE device specifying the ESI (or if PE 120 is not a designated forwarder for the Ethernet segment identified by the ESI for the EVPN instance 169) (YES branch of 808), EVPN module 148 configures forwarding information 156 to block or otherwise eschew sending L2 BUM packets received with the local-bias label on the Ethernet segment identified by the ESI. That is, subsequently, forwarding engine 130 may receive a packet with the local-bias label and not forward the packet.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples of the invention have been described. These and other examples are within the scope of the following claims.

What is claimed is:

1. A method comprising:
   receiving, by a first provider edge (PE) device of a plurality of PE devices configured with an Ethernet Virtual Private Network (EVPN) instance comprising one or more broadcast domains reachable by a plurality of Ethernet segments connecting the plurality of PE devices to a plurality of customer edge (CE) devices, first EVPN routes;
   storing, by the first PE device, for each of the plurality of Ethernet segments, an Ethernet segment identifier received in the first EVPN routes; and
   configuring, by the first PE device in response to determining, based on the Ethernet segment identifiers for the plurality of Ethernet segments, the first PE device has a local interface for each of the plurality of Ethernet segments, forwarding information of the first PE device to cause the first PE device to perform local-bias forwarding of layer 2 (L2) packets for the EVPN instance, wherein local-bias forwarding of L2 packets for the EVPN instance comprises:
   receiving, by the first PE device, an L2 packet for the EVPN instance via a local interface of the first PE device; and
   outputting, by the first PE device, a copy of the L2 packet on the local interface for each of the plurality of Ethernet segments without forwarding a copy of the L2 packet to any of the other PE devices of the plurality of PE devices.

2. The method of claim 1, further comprising:
   receiving, by the first PE device, second EVPN routes; and
   configuring, by the first PE device in response to determining the second EVPN routes indicate the first PE device does not have a local interface for each of the plurality of Ethernet segments, forwarding information of the first PE device to cause the first PE device to perform local-bias forwarding of L2 packets for the EVPN instance including forwarding the L2 packets to other PE devices of the plurality of PE devices.

3. The method of claim 2, wherein local-bias forwarding of L2 packets for the EVPN instance including forwarding the L2 packets to other PE devices of the plurality of PE devices comprises:
   receiving, by the first PE device, an L2 packet for the EVPN instance; and
   outputting, by the first PE device via an intermediate layer 3 network, a copy of the L2 packet to a second PE device of the plurality of PE devices.

4. The method of claim 3, outputting the copy of the L2 packet to the second PE device with a local-bias label indicating the first PE device has performed local-bias forwarding of the L2 packet.

5. The method of claim 4, further comprising:
   outputting, by the first PE device, an EVPN route comprising the local-bias label.

6. The method of claim 5,
   wherein the EVPN route comprises a Border Gateway Protocol extended community that includes the local-bias label, and
   wherein the Border Gateway Protocol extended community comprises one of an Ethernet Segment Identifier extended community and a Local-Bias extended community.

7. The method of claim 1,
   wherein the first PE device is not a designated forwarder for a first Ethernet segment of the plurality of Ethernet segments, and
   wherein local-bias forwarding of L2 packets for the EVPN instance further comprises:
   outputting, by the first PE device, the copy of the L2 packet on the local interface of the first PE device for the first Ethernet segment even though the first PE device is not a designated forwarder for the first Ethernet segment.

8. The method of claim 1, wherein the L2 packets comprise L2 Broadcast, Unknown Unicast, and Multicast (BUM) packets.

9. The method of claim 1,
   wherein each of the plurality of Ethernet segments multihomes to the first PE device and a second PE device of the plurality of PE devices, and
   wherein the first EVPN routes indicate non-zero Ethernet segment identifiers (ESIs) for respective Ethernet segments of the plurality of Ethernet segments.

10. The method of claim 1,
    wherein the first EVPN routes comprise an Ethernet Auto-Discovery per Ethernet Segment route for a first Ethernet segment of the plurality of Ethernet segments, the Ethernet Auto-Discovery per Ethernet Segment route for the first Ethernet segment being advertised by a second PE device of the plurality of PE devices, and
    wherein determining the first EVPN routes indicate the first PE device has a local interface for each of the plurality of Ethernet segments comprises:
    determining, by the first PE device, a routing table of the first PE device for the EVPN instance includes an Ethernet Segment route for the first Ethernet segment, the Ethernet Segment route for the first Ethernet segment being advertised by the second PE device.

11. The method of claim 1, wherein determining the first EVPN routes indicate the first PE device has a local interface for each of the plurality of Ethernet segments comprises:

generating, by the first PE device, a topology table for a second PE device of the plurality of PE devices, wherein the topology table indicates, for each Ethernet segment of the plurality of Ethernet segments that is indicated in an Ethernet Auto-Discovery per Ethernet Segment route advertised by the second PE device and stored to a routing table of the first PE device for the EVPN instance, the routing table includes an Ethernet Segment route for the Ethernet segment.

12. A method comprising:
receiving, by a first provider edge (PE) device of a plurality of PE devices configured with an Ethernet Virtual Private Network (EVPN) instance comprising one or more broadcast domains reachable by a plurality of Ethernet segments connecting the plurality of PE devices to a plurality of customer edge (CE) devices, an L2 packet for the EVPN instance with a local-bias label, via an intermediate layer 3 network interconnecting the plurality of PE devices;
receiving, by the first PE device, first EVPN routes and storing, for each of the plurality of Ethernet segments, an Ethernet segment identifier received in the first EVPN routes;
receiving, by the first PE device, an EVPN route comprising the local-bias label,
wherein the EVPN route is advertised by a second PE device of the plurality of PE devices and the local-bias label indicates the second PE device,
wherein the EVPN route comprises a Border Gateway Protocol extended community that includes the local-bias label, and
wherein the Border Gateway Protocol extended community comprises one of an Ethernet Segment Identifier extended community and a Local-Bias extended community; and
outputting, by the first PE device in response to determining, based on the Ethernet segment identifiers for the plurality of Ethernet segments, the second PE device that is indicated by the local-bias label does not have a local interface for a first Ethernet segment of the plurality of Ethernet segments, the L2 packet on a local interface of the first PE device for the first Ethernet segment.

13. The method of claim 12, wherein the first PE is a designated forwarder for a second Ethernet segment of the plurality of Ethernet segments, the method further comprising:
configuring, by the first PE device in response to determining the second PE device that is indicated by the local-bias label has a local interface for the second Ethernet segment of the plurality of Ethernet segments, forwarding information of the first PE device to block the L2 packet from being forwarded on a local interface of the first PE device for the second Ethernet segment.

14. The method of claim 13, wherein determining the second PE device that is indicated by the local-bias label has a local interface for the second Ethernet segment of the plurality of Ethernet segments comprises:
determining, by the first PE device, a routing table of the first PE device for the EVPN instance includes an Ethernet Segment route for the first Ethernet segment, the Ethernet Segment route for the first Ethernet segment being advertised by the second PE device and one of the first EVPN routes.

15. The method of claim 12, where determining the second PE device that is indicated by the local-bias label does not have a local interface for a first Ethernet segment of the plurality of Ethernet segments comprises:
determining, by the first PE device, a routing table of the first PE device for the EVPN instance does not include an Ethernet Segment route for the first Ethernet segment, the Ethernet Segment route for the first Ethernet segment being advertised by the second PE device and one of the first EVPN routes.

16. A first provider edge (PE) device comprising:
a memory; and
one or more processors operably coupled to the memory, wherein the one or more processors and memory are configured to:
receive configuration data configuring the first PE device with an Ethernet Virtual Private Network (EVPN) instance comprising one or more broadcast domains reachable by a plurality of Ethernet segments connecting a plurality of PE devices, including the first PE device, to a plurality of customer edge (CE) devices,
receive first EVPN routes,
store, for each of the plurality of Ethernet segments, an Ethernet segment identifier received in the first EVPN routes, and
configure, in response to a determination, based on the Ethernet segment identifiers for the plurality of Ethernet segments, the first EVPN routes indicate the first PE device has a local interface for each of the plurality of Ethernet segments, forwarding information of the first PE device to cause the first PE device to perform local-bias forwarding of layer 2 (L2) packets for the EVPN instance, wherein local-bias forwarding of L2 packets for the EVPN instance comprises:
receiving, by the first PE device, an L2 packet for the EVPN instance via a local interface of the first PE device; and
outputting, by the first PE device, a copy of the L2 packet on the local interface for each of the plurality of Ethernet segments without forwarding a copy of the L2 packet to any of the other PE devices of the plurality of PE devices.

17. A first provider edge (PE) device comprising:
a memory; and
one or more processors operably coupled to the memory, wherein the one or more processors and memory are configured to:
receive configuration data configuring the first PE device with an Ethernet Virtual Private Network (EVPN) instance comprising one or more broadcast domains reachable by a plurality of Ethernet segments connecting a plurality of PE devices, including the first PE device, to a plurality of customer edge (CE) devices,
receive first EVPN routes and store, for each of the plurality of Ethernet segments, an Ethernet segment identifier received in the first EVPN routes,
receive an L2 packet for the EVPN instance with a local-bias label, via an intermediate layer 3 network interconnecting the plurality of PE devices,
receive an EVPN route comprising the local-bias label, wherein the EVPN route is advertised by a second PE device of the plurality of PE devices and the local-bias label indicates the second PE device,
wherein the EVPN route comprises a Border Gateway Protocol extended community that includes the local-bias label, and wherein the Border Gateway Protocol extended community comprises one of an Ethernet Segment Identifier extended community and a Local-Bias extended community, and output, in response to determining, based on the Ethernet segment identifiers for the plurality of Ethernet segments, the second PE device that is indicated by the local-bias label does not have a local interface for a first Ethernet segment of the plurality of Ethernet segments, the L2 packet on a local interface of the first PE device for the first Ethernet segment.

* * * * *